(12) United States Patent
Okamoto et al.

(10) Patent No.: US 11,463,163 B2
(45) Date of Patent: Oct. 4, 2022

(54) DEVICE FOR MEASURING OPTICAL FREQUENCY REFLECTION AND MEASUREMENT METHOD THEREOF

(71) Applicant: NIPPON TELEGRAPH AND TELEPHONE CORPORATION, Tokyo (JP)

(72) Inventors: Tatsuya Okamoto, Musashino (JP); Daisuke Iida, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/430,016

(22) PCT Filed: Jan. 29, 2020

(86) PCT No.: PCT/JP2020/003108
§ 371 (c)(1),
(2) Date: Aug. 11, 2021

(87) PCT Pub. No.: WO2020/166331
PCT Pub. Date: Aug. 20, 2020

(65) Prior Publication Data
US 2022/0149934 A1    May 12, 2022

(30) Foreign Application Priority Data
Feb. 12, 2019    (JP) .............................. JP2019-022953

(51) Int. Cl.
*H04B 10/07* (2013.01)
*H04B 10/071* (2013.01)
(Continued)

(52) U.S. Cl.
CPC ....... *H04B 10/071* (2013.01); *H04B 10/2507* (2013.01); *G01M 11/3109* (2013.01);
(Continued)

(58) Field of Classification Search
CPC .............. H04B 10/071; H04B 10/2507; H04B 10/07; H04B 10/61; H04B 10/63; H04B 10/64;
(Continued)

(56) References Cited

U.S. PATENT DOCUMENTS 9,683,928 B2 * 6/2017 Swanson ................ G01S 7/4817
10,247,581 B2 * 4/2019 Ronnekleiv .............. G01B 9/02
(Continued)

FOREIGN PATENT DOCUMENTS

JP    2003322588 A    11/2003
JP    2003322589 A    11/2003
(Continued)

OTHER PUBLICATIONS

W. Eickhoff and R. Ulrich, Optical frequency domain reflectometry in single-mode fiber, Applied Physics Letters, vol. 39, No. 9, 1981, pp. 693-695.
(Continued)

*Primary Examiner* — Dibson J Sanchez

(57) ABSTRACT

The purpose of the present invention is to provide a device for optical frequency domain reflectometry and a method thereof that can measure a reflectance distribution with less spatial resolution degradation due to a phase noise, without using a wideband receiving system even when a long-distance measurement is performed. The device for optical frequency domain reflectometry according to the present invention is provided with a delay optical fiber for delaying a local light by a prescribed time, and obtains information on a relative delay of a backscattered light from an optical fiber under measurement with respect to the local light and
(Continued)

information on the positivity and the negativity of a beat frequency by measuring an in-phase component and a quadrature component of a beat signal obtained by multiplexing the backscattered light from the optical fiber under measurement and the local light delayed by the delay optical fiber, so as to obtain a reflectance distribution in a longitudinal direction of the optical fiber under measurement based on these pieces of information.

10 Claims, 2 Drawing Sheets

(51) Int. Cl.
*H04B 10/2507* (2013.01)
*G01M 11/00* (2006.01)
*H04B 10/61* (2013.01)
*H04B 10/63* (2013.01)
*H04B 10/64* (2013.01)

(52) U.S. Cl.
CPC ......... *G01M 11/3172* (2013.01); *H04B 10/07* (2013.01); *H04B 10/61* (2013.01); *H04B 10/63* (2013.01); *H04B 10/64* (2013.01)

(58) Field of Classification Search
CPC .......... G01M 11/3109; G01M 11/3172; G01B 11/00; G01D 5/353
USPC ...................................... 398/9–38
See application file for complete search history.

(56) References Cited

U.S. PATENT DOCUMENTS

| | | | |
|---|---|---|---|
| 2009/0231591 A1* | 9/2009 | Ito | G01M 11/3163 356/450 |
| 2010/0097615 A1* | 4/2010 | Fan | G01M 11/3172 356/450 |
| 2012/0174677 A1* | 7/2012 | Hill | G01D 5/35358 73/655 |
| 2017/0307475 A1* | 10/2017 | Eyal | H04B 10/07 |
| 2018/0031471 A1* | 2/2018 | Eyal | H04B 10/07 |
| 2018/0238680 A1* | 8/2018 | Khomenko | G01M 11/3136 |
| 2018/0371729 A1 | 12/2018 | Sugino | |
| 2020/0124497 A1* | 4/2020 | Furukawa | G01D 5/35306 |
| 2021/0116265 A1* | 4/2021 | Tadakuma | G02B 6/4432 |
| 2021/0325210 A1* | 10/2021 | Matsuura | G01D 5/35364 |

FOREIGN PATENT DOCUMENTS

| | | |
|---|---|---|
| JP | 2013195225 A | 9/2013 |
| JP | 2014209685 A | 11/2014 |
| JP | 2018146371 A | 9/2018 |
| WO | WO-2017115459 A1 | 7/2017 |

OTHER PUBLICATIONS

Brian J. Seller et al., High resolution optical frequency domain reflectometry for characterization of components and assemblies, Optics Express, vol. 13, No. 2, 2005, pp. 666-674.

Xinyu Fan et al., Centimeter-level spatial resolution over 40 km realized by bandwidth-division phase-noise-compensated OFDR, Optics Express, vol. 19, No. 20, 2011, pp. 19122-19128.

* cited by examiner

DEVICE FOR MEASURING OPTICAL FREQUENCY REFLECTION AND MEASUREMENT METHOD THEREOF

CROSS-REFERENCE TO RELATED APPLICATIONS

This application is a 371 U.S. National Phase of International Application No. PCT/JP2020/003108 filed on Jan. 29, 2020, which claims priority to Japanese Application No. 2019-022953 filed on Feb. 12, 2019. The entire disclosures of the above applications are incorporated herein by reference.

TECHNICAL FIELD

The present disclosure relates to optical frequency reflectometry (OFDR).

BACKGROUND ART

As a technique of optical fiber reflectometry, a technique of optical frequency domain reflectometry (hereinafter referred to as OFDR) described in Non-Patent Literature 1 (hereinafter referred to as Prior Art 1) has been established. In OFDR, a frequency swept light source capable of linearly sweeping an optical frequency is used. A frequency swept light is split into a probe light and a local light, and a beat signal of a backscattered light from an optical fiber generated by making the probe light incident on the optical fiber and the local light is measured. Since the backscattered light is a replica delayed with respect to the local light in time, a beat frequency $f_{beat}$ of the backscattered light from a distance z and the local light is given by the following expression:

$$f_{beat} = \gamma 2z/c$$

where, $\gamma$ is a frequency sweep speed, c is a speed of light in the optical fiber, and 2z/c is a delay of the backscattered light from the distance z with respect to the local light.

Since the frequency swept light source is used, the optical band can be easily widened, and in Non-Patent Literature 2 (hereinafter referred to as Prior Art 2), a spatial resolution of 22 μm has been reported. Frequency sweep nonlinearity caused by a phase noise of a laser is a factor that degrades the spatial resolution. However, in Non-Patent Literature 3 (hereinafter referred to as Prior Art 3), a long-distance measurement of 40 km has been reported, which does not degrade the spatial resolution by compensating for the nonlinearity by signal processing.

CITATION LIST

Non-Patent Literature

Non-Patent Literature 1: W. Eickhoff and R. Ulrich. "Optical frequency domain reflectometry in single-mode fiber," Appl. Phys. Lett., vol. 39, 1981.
Non-Patent Literature 2: B. J. Soller et al., "High resolution optical frequency domain reflectometry for characterization of components and assemblies," Opt. Exp., vol. 13, no. 2, 2005.
Non-Patent Literature 3: X. Fan et al., "Centimeter-level spatial resolution over 40 km realized by bandwidth-division phase-noise-compensated OFDR," Opt. Exp., vol. 19, no. 20, 2011.

SUMMARY OF THE INVENTION

Technical Problems

The distance in the conventional method is an absolute distance, and the absolute distance is assigned to the beat frequency with a coefficient of $\gamma 2/c$. For this reason, a problem with the conventional method is that the beat frequency of the backscattered light from a long distance is high, which necessitates a wideband receiving system. Another problem with the conventional method is that in the long-distance measurement, the signal processing for compensating for the phase noise of the laser is necessary to prevent the spatial resolution degradation, which results in a longer measurement time because of the time necessary for the processing.

Therefore, in order to solve the above problems, an object of the present invention is to provide a device for optical frequency domain reflectometry and a method thereof that can measure a reflectance distribution with less spatial resolution degradation due to a phase noise, without using a wideband receiving system even when a long-distance measurement is performed.

Means for Solving the Problem

In order to achieve the above object, in the device for optical frequency domain reflectometry and the method thereof according to the present invention, a beat frequency is assigned to a relative distance based on a distance that serves as a reference, instead of assigning the beat frequency to an absolute distance.

Specifically, the device for optical frequency domain reflectometry according to the present invention includes a delay optical fiber for delaying a local light such that an arbitrary point in a longitudinal direction of an optical fiber under measurement is a reference, and an analysis unit for expressing a beat frequency of a beat signal of the local light and a backscattered light by a relative delay of the backscattered light with respect to the local light that has been delayed by the delay optical fiber.

Specifically, in the method of optical frequency domain reflectometry according to the present invention, in the OFDR, a local light is delayed by a delay optical fiber such that an arbitrary point in a longitudinal direction of an optical fiber under measurement is a reference, and a beat frequency of a beat signal of the local light and a backscattered light is expressed by a relative delay of the backscattered light with respect to the local light that has been delayed by the delay optical fiber.

In the device for optical frequency domain reflectometry and the method thereof according to the present invention, it is possible to achieve a measurement without increasing a beat frequency even in a long-distance measurement by delaying a local light and lengthening a distance that serves as a reference. It is also possible to suppress spatial resolution degradation due to a phase noise without performing signal processing.

Therefore, according to the present invention, it is possible to provide a device for optical frequency domain reflectometry and a method thereof that can measure a reflectance distribution with less spatial resolution degradation due to a phase noise, without using a wideband receiving system even when a long-distance measurement is performed.

In the device for optical frequency domain reflectometry and the method thereof according to the present invention, the beat signal is generated by multiplexing the local light and the backscattered light with an optical 90 degree hybrid, and a position in a longitudinal direction of the optical fiber under measurement, from which the backscattered light is generated, is identified by obtaining an in-phase component and a quadrature component of the beat signal from the optical 90 degree hybrid and then determining whether the beat frequency of the beat signal is positive or negative from the in-phase component and the quadrature component.

In the device for optical frequency domain reflectometry and a method thereof according to the present invention, a beat frequency that exceeds a Nyquist frequency of an A/D converter is reduced from the in-phase component and the quadrature component of the beat signal obtained from the optical 90 degree hybrid before A/D converting the in-phase component and the quadrature component of the beat signal obtained from the optical 90 degree hybrid. As a result, a noise can be reduced by suppressing an occurrence of aliasing.

In the device for optical frequency domain reflectometry and the method thereof according to the present invention, a delay amount of the delay optical fiber is changed according to a position at which the optical fiber under measurement is to be measured. In a long-distance measurement, a backscattered light from a long distance can be measured without increasing the beat frequency by increasing a delay of a local light.

Effects of the Invention

According to the present invention, it is possible to provide a device for optical frequency domain reflectometry and a method thereof that can measure a reflectance distribution with less spatial resolution degradation due to a phase noise, without using a wideband receiving system even when a long-distance measurement is performed.

DESCRIPTION OF EMBODIMENTS

Figure 1:
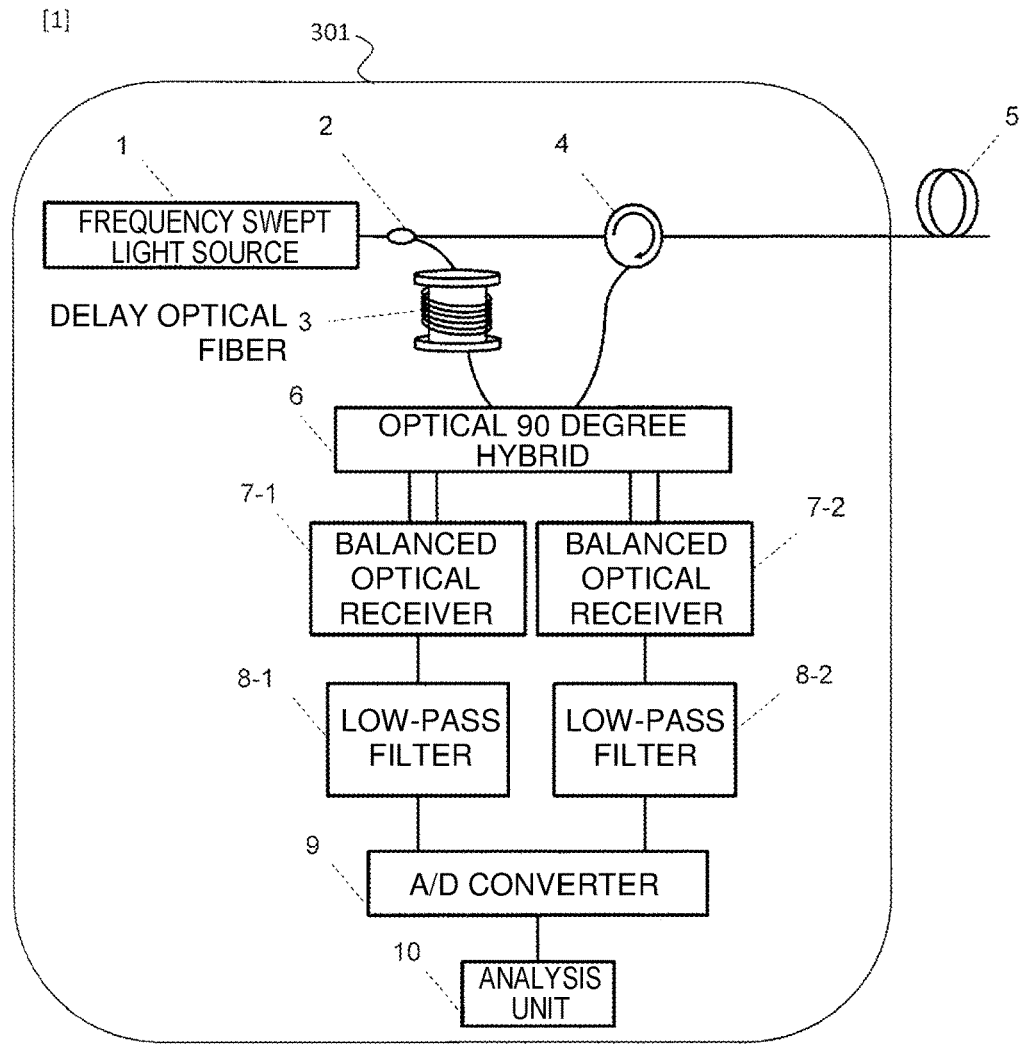
FIG. 1 is a diagram for describing the device for optical frequency domain reflectometry according to the present invention.

Embodiments of the present invention will be described with reference to the accompanying drawings. The embodiments described below are examples of the present invention, and the present invention is not limited to the following embodiments. It should be noted that, in the present description and the drawings, components having the same reference numerals indicate the same components as each other.

FIG. 1 is a diagram for describing a device for optical frequency domain reflectometry 301 of the present embodiment. Reference numeral 1 denotes a frequency swept light source, 2 denotes a light splitting means, 3 denotes a delay optical fiber, 4 denotes an optical circulator, 5 denotes an optical fiber under measurement, 6 denotes an optical 90 degree hybrid, 7-1 and 7-2 denote balanced optical receivers, 8-1 and 8-2 denote electrical low-pass filters, 9 denotes an A/D converter, and 10 denotes an analysis unit.

A frequency swept light outputted from the frequency swept light source 1 is split into two by the light splitting means 2. One is split as a probe light propagating to the optical circulator 4, and the other propagates through the delay optical fiber 3 and is split as a local light propagating to the optical 90 degree hybrid 6. The probe light made incident on the optical fiber under measurement 5 via the optical circulator 5 is backscattered by a scatterer constituting the optical fiber under measurement 5. The light that has been backscattered is a superposition of the backscattered lights from the respective positions of the optical fiber under measurement 5, and propagates as a signal light to the 90 degree hybrid 6 via the optical circulator 5. The local light and the signal light are multiplexed with the optical 90 degree hybrid 6, and an in-phase component and a quadrature component of a beat signal thereof are detected by the balanced optical receivers 7-1 and 7-2, respectively. Unwanted high frequencies contained in the detected in-phase component and quadrature component of the beat signal are removed by the low-pass filters 8-1 and 8-2, respectively. The in-phase component and the quadrature component of the beat signal, whose high-frequencies have been removed by the low-pass filters, are converted into numerical values (digitized) by the A/D converter 9. The measured in-phase component and quadrature component of the beat signal are analyzed by the analysis unit 10 so that the reflectance of the optical fiber under measurement is measured.

The delay optical fiber 3 delays the local light such that an arbitrary point in a longitudinal direction of the optical fiber under measurement 5 is a reference. The analysis unit 10 expresses a beat frequency of a beat signal of the local light and the backscattered light by a relative delay of the backscattered light with respect to the local light that has been delayed by the delay optical fiber 3.

Now, it will be described that the device for optical frequency domain reflectometry 301 can measure the reflectance of the optical fiber under measurement 5 at the relative distance, using the length of the delay optical fiber 3 as a reference for the relative distance. Then, it will be described that with respect to the prior art, the device for optical frequency domain reflectometry 301 realizes a measurement without increasing the beat frequency in a long-distance measurement, and suppresses spatial resolution degradation due to a phase noise of a laser without performing signal processing.

A photoelectric field waveform E(t) emitted from the frequency swept light source 1 is expressed by the following expression:

[Math. 1]

$$E(t) \propto \exp[j\{2\pi(\nu_0 + \tfrac{1}{2}\gamma t)t + \theta(t)\}] \qquad (1)$$

where, $\nu_0$ represents an optical frequency at the frequency sweep start time, $\gamma$ represents a frequency sweep speed, and $\theta(t)$ represents a phase noise of the light source. The local light propagates through the delay optical fiber having a length of $z_{LO}$, and the photoelectric field waveform $E_{LO}(t)$ is expressed by the following expression:

[Math. 2]

$$E_{LO} = E(t - \tau_{LO}), \tau_{LO} = z_{LO}/c \qquad (2)$$

where, $\tau_{LO}$ represents a delay due to the propagation of the delay optical fiber, and c represents a speed of light in the optical fiber. On the other hand, a backscattered light $E_{SIG}(t)$ from the optical fiber under measurement 5 is a superposition of the backscattered lights from the respective distances z and is expressed by the following expression:

[Math. 3]

$$E_{SIG}(t) = \int d\tau R(\tau) E(t-\tau), \tau = 2z/c \qquad (3)$$

where, $\tau$ represents a delay due to round-trip propagation of distance z, and $R(\tau)$ represents an optical reflectance at the delay $\tau$.

The local light given by the expression (2) and the backscattered light expressed by the expression (3) are multiplexed with the optical 90 degree hybrid 6, and an in-phase component I(t) and a quadrature component Q(t) of the beat signal $E_{SIG}{}^*(t) \cdot E_{LO}(t)$ are detected by the balanced optical receivers (7-1, 7-2).

[Math. 4]

$$E_{SIG}{}^*(t) \cdot E_{LO}(t) = \int d\tau \sqrt{R(\tau)} \exp[j\{2\pi\gamma(t-\tau_{LO})t + \theta(t-\tau_{LO}) + \varphi(\tau)\}] \qquad (4)$$

[Math. 5]

$$\varphi(\tau) = v_0(\tau - \tau_{LO}) - \pi\gamma(\tau^2 - \tau_{LO}{}^2) \qquad (5)$$

[Math. 6]

$$I(t) = \mathrm{Re}[E^*_{SIG}(t) \cdot E_{LO}(t)], Q(t) = \mathrm{Im}[E^*_{SIG}(t) \cdot E_{LO}(t)] \qquad (6)$$

Expression (4) expresses that the beat signal is a superposition of waves of an amplitude $\sqrt{R(\tau)}$ where a beat frequency $\gamma(\tau-\tau_{LO})$ is determined by a relative delay $\tau-\tau_{LO}$ based on a delay $\tau_{LO}$ of the local light. In order to determine whether the beat frequency is positive or negative, an analysis signal S(t) is generated from the in-phase component I(t) and the quadrature component Q(t) of the beat signal $E_{SIG}{}^*(t) \cdot E_{LO}(t)$ expressed by Expression (6).

[Math. 7]

$$S(t) = I(t) + jQ(t) = \int d\tau \sqrt{R(\tau)} \exp[j\{2\pi\gamma(\tau-\tau_{LO})t + \theta(t-\tau) - \theta(t-\tau_{LO}) + \varphi(*\tau)\}] \qquad (7)$$

Fourier transform is applied to Expression (7) so as to obtain an expression of an analysis signal in a beat frequency domain. Here, for simplicity, a term of the phase noise $\theta(t-\tau)-\theta(t-\tau_{LO})$ in the expression (4) is not considered.

[Math. 8]

$$\tilde{S}(f) = \int d\tau \sqrt{R(\tau)} \int dt \exp(-j2\pi f t) \exp[j\{2\pi\gamma(\tau-\tau_{LO})t + \varphi(\tau)\}] \qquad (8)$$
$$= \int d\tau \sqrt{R(\tau)} \exp[j\varphi(\tau)] \cdot \delta[2\pi\{\gamma(\tau-\tau_{L0}) - f\}]$$

where, f represents the beat frequency.

The expression (8) expresses that a complex amplitude $\sqrt{R(\tau)} \exp[j\varphi(\tau)]$ is sampled by a sampling function $\delta[2\pi\{\gamma(\tau-\tau_{LO})-f\}]$ in the beat frequency domain. Though the term of the phase noise $\theta(t-\tau)-\theta(t-\tau_{LO})$ in the expression (4) is not considered, this term of the phase noise has an effect of widening the width of a sampling function.

The expression (8) expresses that the complex amplitude $\sqrt{R(\tau)} \exp[j\varphi(\tau)]$ is assigned to the beat frequency $\gamma(\tau-\tau_{LO})$, which means that the complex amplitude $\sqrt{R(\tau)} \exp[j\varphi(\tau)]$ at an absolute delay $\tau$ is expressed by a relative delay $\tau\tau-\tau_{LO}$. The larger the magnitude of the relative delay $|\tau-\tau_{LO}|$ (the farther from a relative delay reference $\tau_{LO}$), the higher the beat frequency is.

The beat frequency that exceeds the Nyquist frequency of the A/D converter 9 causes aliasing, which is an aliasing noise. In order to prevent this, the low-pass filters 8-1 and 8-2 as anti-aliasing filters extract only low frequencies in the beat frequency contained in the expression (8). When a sampling rate of the A/D converter 9 is $f_{sam}$, the Nyquist frequency of the A/D converter 9 is $f_{sam}/2$, and the condition for preventing aliasing is given by the following expression:

[Math. 9]

$$|\gamma(\tau-\tau_{LO})| \leq f_{sam}/2 \qquad (9)$$

Aliasing can be prevented by setting a cutoff frequency of the low-pass filters 8-1 and 8-2 so as to satisfy the expression (9).

Now, the present invention and the prior art will be compared. The prior art is a case of $\tau_{LO}=0$ in the expression (4), and in order to measure only the in-phase component of the beat signal component, the beat signal S'(t) to be measured is expressed, using the expressions (4) and (5), by the following expressions.

[Math. 10]

$$S'(t) = \mathrm{Re}[\int d\tau \sqrt{R(\tau)} \exp[j\{2\pi\gamma\tau t + \theta(t-\tau) - +\varphi'(\tau)\}]] \qquad (10)$$

[Math. 11]

$$\varphi'(\tau) = v_0 \tau - \pi\gamma\tau^2 \qquad (11)$$

The expression (10) expresses that the beat signal is a superposition of waves of the amplitude $\sqrt{R(\tau)}$, where the beat frequency $\gamma\tau$ is determined by an absolute delay $\tau$ of the optical fiber under measurement. By analyzing a spectrum of the expression (10), it is possible to obtain the spectrum having the reflectance $R(\tau)$ at the beat frequency $\gamma\tau$, and this spectrum represents the reflectance of the optical fiber under measurement having the reflectance $R(\tau)$ at the absolute delay $\tau$.

Figure 2:
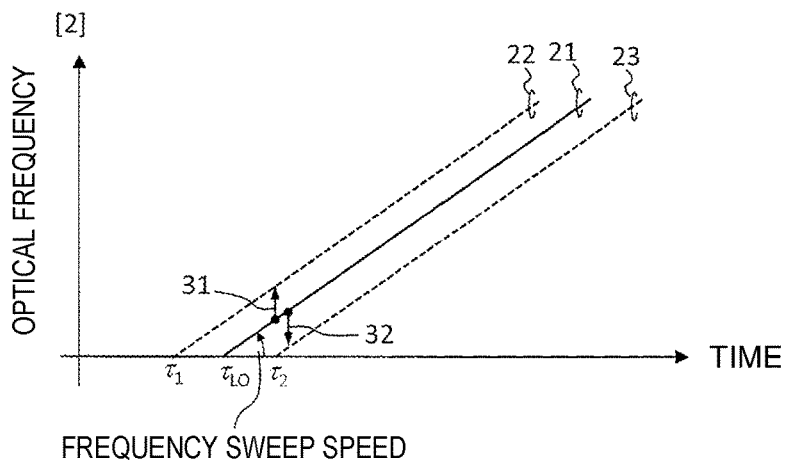
FIG. 2 is a diagram for describing the measurement principle of the device for optical frequency domain reflectometry according to the present invention.
Figure 3:
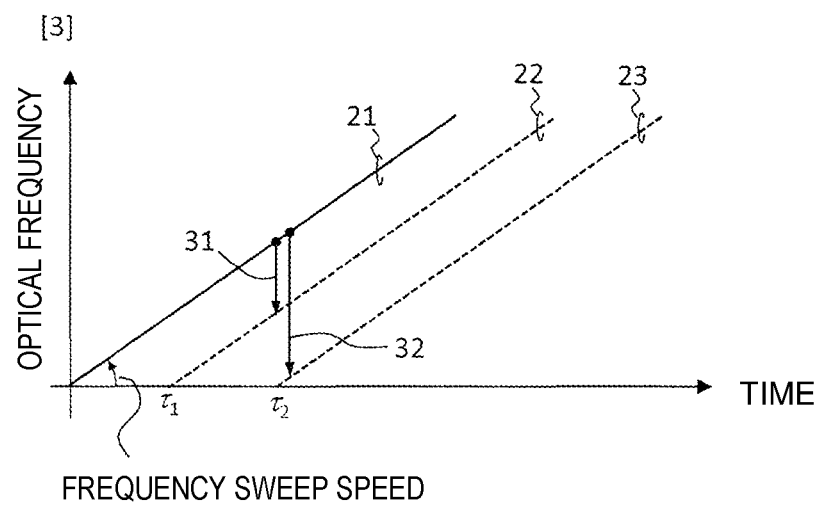
FIG. 3 is a diagram for describing the measurement principle of a conventional device for optical frequency domain reflectometry according to the present invention.

When the expressions (7) and (10) are compared, as shown in FIG. 2, the beat frequencies (31, 32) of the present invention are given by the relative delay based on the delay of a local light 21. The beat frequency 31 is a beat frequency $\gamma(\tau_1-\tau_{LO})$ of a backscattered light 22 having a delay $\tau_1$, and has a negative value. The beat frequency 31 is a beat frequency $\gamma(\tau_2-\tau_{LO})$ of a backscattered light 23 having a delay $\tau_2$, and has a positive value. In the long-distance measurement, by setting a delay $\tau_{LO}$ of the local light 21 according to a desired measurement point (setting in the vicinity of the measurement point), the backscattered light from a long distance can be measured without increasing the beat frequency. In addition, based on whether the beat frequency is positive or negative, it is possible to determine whether the backscattered light is the one on the far end side or the one on the near end side with respect to the set delay. On the other hand, in the prior art, since the beat frequency is given by the absolute delay of the optical fiber under measurement 5, the beat frequency 32 ($\gamma\tau_2$) of the backscattered light 23 from the far end is higher than the beat frequency 31 ($\gamma\tau_1$) of the backscattered light 22 from the near end.

In addition, though the spatial resolution degradation due to a phase noise is given by $\theta(t-\tau)-\theta(t-\tau_{LO})$ in the present invention, the spatial resolution degradation is given as $\theta(t-\tau)-\theta(t)$ in the prior art. The larger the relative amount of delay between the two phase noises, the more the spatial resolution is degraded. Since the degradation is determined by the relative delay $\tau-\tau_{LO}$ in the present invention, which is determined by the absolute delay $\tau$ in the prior art, it is possible to suppress the spatial resolution degradation due to a phase noise in the long-distance measurement.

When the optical fiber under measurement 5 is short or the reflectance in a domain on the near end side of the optical fiber under measurement 5 (the side close to the incident end of the probe light) is measured, the beat frequency of the beat signal may be given by an absolute distance as in the prior art. However, when the optical fiber under measurement 5 is long or the reflectance in a domain on the far end side of the optical fiber under measurement 5 (the side far from the incident end of the probe light) is measured, it is preferable to give the beat frequency of the beat signal by a relative delay based on a delay of a local light by delaying the local light with the delay optical fiber 5, as in the present invention. In addition, it is preferable to adjust a delay amount of the local light according to the position at which the reflectance is to be measured.

Effects of the Invention

The light reflection measuring device according to the present invention has the following advantageous characteristics with respect to the prior art.

In Prior Arts 1 to 3, since the absolute delay of the optical fiber is assigned to the beat frequency, a wideband receiving system is required for a long-distance measurement. However, in the present invention, the relative delay with respect to the delay of the local light is assigned to the beat frequency. By increasing the delay of the local light, the beat frequency from a long distance is reduced, which eliminates the need for the wideband receiving system.

In Prior Art 3, since the spatial resolution is degraded due to a phase noise by the absolute delay, the reflectance of the fiber is measured after performing signal processing in which the beat signal measured based on a time waveform of the phase noise measured by a reference interferometer is digitally resampled (interpolated), and then spectrally analyzing the resampled beat signal. In the present invention, since the spatial resolution is degraded due to a phase noise by the relative delay, the spatial resolution does not degrade in the long-distance measurement as much as in the prior arts. As a result, it is possible to measure the reflectance of the fiber only by spectrum analysis of the measured beat signal.

[Supplementary Note]

The following is a description of the light reflection measuring device according to the present invention.

(1): The light reflection measuring device according to the present invention is a device for measuring a reflectance distribution of an optical fiber under measurement, which includes a frequency swept light source, a light splitting means for splitting a frequency swept light, which is outputted from the frequency swept light source, into two, an optical circulator for guiding a backscattered light that is one of the frequency swept light and made incident on the optical fiber under measurement, a delay optical fiber for making the other one of the frequency swept light a local light and providing a delay to the local light, an optical 90 degree hybrid for multiplexing the backscattered light and the local light to which the delay has been provided by the delay optical fiber, a means for detecting and outputting an in-phase component and a quadrature component of a beat signal of the multiplexed backscattered light and local light, low-pass filters for removing high frequencies contained in the outputted in-phase component and quadrature component of the beat signal, an A/D converter for A/D converting the in-phase component and the quadrature component of the beat signal from which the high frequencies have been removed by the low-pass filters, and an analysis unit for analyzing a spectrum from the A/D converted in-phase component and quadrature component of the beat signal.

(2): The light reflection measuring device according to the present invention determines a beat frequency by a relative delay of a backscattered light based on a delay provided for a local light, measures an in-phase component and a quadrature component of a beat signal with an optical 90 degree hybrid, generates an analysis signal of the beat signal from the in-phase component and the quadrature component of the beat signal, and measures a reflectance of an optical fiber under measurement at a relative delay set by the delay of the local light by distinguishing between a positive sign and a negative sign of a frequency of the analysis signal.

(3): The light reflection measuring device according to the present invention determines a phase noise contained in a beat signal by a relative delay of a backscattered light based on a delay provided for the local light, and reduces the phase noise contained in the beat signal in the long-distance measurement by lengthening the delay provided for the local light.

REFERENCE SIGNS LIST

1 Frequency swept light source
2 Light splitting means
3 Delay optical fiber
4 Optical circulator
5 Optical fiber under measurement
6 Optical 90 degree hybrid
7-1, 7-2 Balanced optical receivers
8-1, 8-2 Electrical low-pass filters
9 A/D converter
10 Analysis unit
21 Local light
22, 23 Backscattered lights
31, 32 Beat frequencies
301 Device for optical frequency domain reflectometry

The invention claimed is:

1. A device for optical frequency domain reflectometry (OFDR), comprising:
 a delay optical fiber configured to delay a local light such that an arbitrary point in a longitudinal direction of a measuring optical fiber under measurement is a reference; and
 an analysis unit, the analysis unit including:
  an optical 90 degree hybrid, the optical 90 degree hybrid being configured to:
   receive the local light from the delay optical fiber and a backscattered light from the measuring optical fiber; and
   multiplex the local light and the backscattered light to generate a beat signal, the beat signal having an in-phase component and a quadrature component, a beat frequency of the beat signal being expressed by a relative delay of the backscattered light with respect to the local light that has been delayed by the delay optical fiber;
  a low-pass filter configured to reduce the beat frequency that exceeds a Nyquist frequency of an A/D converter from the in-phase component and the quadrature component of the beat signal; and
  the A/D converter configured to perform A/D conversion of the filtered in-phase component and the filtered quadrature component of the beat signal.

2. The device for OFDR according to claim 1, wherein the analysis unit identifies a position in the longitudinal direction of the measuring optical fiber, from which the backscattered light is generated, by determining whether the beat frequency of the beat signal is positive or negative from the in-phase component and the quadrature component.

3. The device for OFDR according to claim 1, further comprising a delay amount variable mechanism configured to change a delay amount of the delay optical fiber.

4. The device for OFDR according to claim 1, wherein a reflectance of the measuring optical fiber is measured based on digitized values due to the A/D conversion of the filtered in-phase component and the filtered quadrature component of the beat signal.

5. The device for OFDR according to claim 1, wherein the analysis unit further includes first and second balanced optical receivers, and the first and second balanced optical receivers receive the beat signal so as to detect the in-phase component and the quadrature component of the beat signal, respectively, the low-pass filter is configured with first and second filters, and the first and second filters receive the in-phase component and the quadrature component of the beat signal from the first and second balanced optical receivers, respectively, to reduce the beat frequency, and the A/D converter receives the filtered in-phase component and the filtered quadrature component of the beat signal from the first and second filters, respectively.

6. A measurement method in optical frequency domain reflectometry (OFDR), the measurement method comprising:
delaying a local light by a delay optical fiber such that an arbitrary point in a longitudinal direction of a measuring optical fiber under measurement is a reference:
receiving, by an optical 90 degree hybrid, the local light from the delay optical fiber and a backscattered light from the measuring optical fiber;
multiplexing, by the optical 90 degree hybrid, the local light and the backscattered light to generate a beat signal, the beat signal having an in-phase component and a quadrature component, a beat frequency of the beat signal being expressed by a relative delay of the backscattered light with respect to the local light that has been delayed by the delay optical fiber;
reducing, by a low-pass filter, the beat frequency that exceeds a Nyquist frequency of and A/D converter from the in-phase component and the quadrature component of the beat signal; and
performing, by the A/D converter, A/D conversion of the filtered in-phase component and the filtered quadrature component of the beat signal.

7. The measurement method according to claim 6, further comprising:
identifying a position in the longitudinal direction of the measuring optical fiber, from which the backscattered light is generated, by determining whether the beat frequency of the beat signal is positive or negative from the in-phase component and the quadrature component of the beat signal.

8. The measurement method according to claim 6, wherein a delay amount of the delay optical fiber is changed according to a position at which the measuring optical is to be measured.

9. The measurement method according to claim 6, further comprising:
measuring a reflectance of the measuring optical fiber based on digitized values due to the A/D conversion of the filtered in-phase component and the filtered quadrature component of the beat signal.

10. The measurement method according to claim 6, wherein the beat signal is received by first and second balanced optical receivers so as to detect the in-phase component and the quadrature component of the beat signal, respectively, the low-pass filter is configured with first and second filters, and the first and second filters receive the in-phase component and the quadrature component of the beat signal from the first and second balanced optical receivers, respectively, to reduce the beat frequency, and the A/D converter receives the filtered in-phase component and the filtered quadrature component of the beat signal from the first and second filters, respectively.

* * * * *